United States Patent [19]

Tominaga et al.

[11] Patent Number: 4,495,234

[45] Date of Patent: Jan. 22, 1985

[54] WEATHER STRIP FOR AUTOMOBILES

[75] Inventors: Masahiro Tominaga, Aichi-ken; Kenichi Nakamura, Ichinomiya-shi; Kunio Mishima, Inazawa-shi, all of Japan

[73] Assignee: Toyoda Gosei Co., Ltd., Aichi-Ken, Japan

[21] Appl. No.: 428,612

[22] Filed: Sep. 30, 1982

[30] Foreign Application Priority Data

Oct. 27, 1981 [JP] Japan .................. 56-159762[U]

[51] Int. Cl.³ .................................................. E06B 7/16
[52] U.S. Cl. ...................................... 428/122; 49/476; 49/490; 49/498; 428/131; 428/358
[58] Field of Search ............... 428/122, 358, 31, 131; 49/498, 476, 490

[56] References Cited

U.S. PATENT DOCUMENTS

| 3,665,646 | 5/1972 | Niemanns | 428/122 X |
| 3,706,628 | 12/1972 | Azzola | 428/122 X |
| 3,927,493 | 12/1975 | Tsuneishi et al. | 49/498 X |
| 4,123,071 | 10/1978 | Yamamoto | 49/476 X |
| 4,324,826 | 4/1982 | Ginster | 428/358 X |
| 4,348,443 | 9/1982 | Hein | 428/122 |

Primary Examiner—Henry F. Epstein
Attorney, Agent, or Firm—Cushman, Darby & Cushman

[57] ABSTRACT

A weather stripping for sealing a vehicle body flange. The weather strip includes a sealing member integrally formed with a channel or strip body having an opening for receiving a body flange therein. The weather strip includes at least one sealing lip formed on an inner surface of the strip body that extends in the longitudinal direction and a connecting portion in which the interior sealing lip is cut away to define an interior passageway that will communicate with the outside of the channel. This assures draining of water and the like which may have entered inside the strip body.

2 Claims, 6 Drawing Figures

WEATHER STRIP FOR AUTOMOBILES

SUMMARY OF THE INVENTION

The present invention concerns a weather strip for a vehicle having a body flange, such as around a door of a vehicle to be sealed. The strip is shaped in the form of a channel having an opening extending in the longitudinal direction thereof, the opening receiving the body flange therein. The strip also includes at least one sealing lip formed on an inner surface of the channel, the sealing lip extending in the longitudinal direction and projecting inwardly. The improvement comprises the inclusion of at least one opening in the channel defined by a cutaway portion of the sealing lip and an absence of internal sealing lips at the channel opening with the opening communicating with the exterior of the vehicle.

DETAILED EXPLANATION OF DEVICE

It is accordingly an object of the invention to provide in a weather strip for a vehicle having a body flange to be sealed, which is adapted to fit for the sealing on the body flange, an improvement which permits a favorable draining of water and the like as having entered inside of a strip body of the weather strip.

DESCRIPTION OF THE PREFERRED EMBODIMENT

Figure 1:
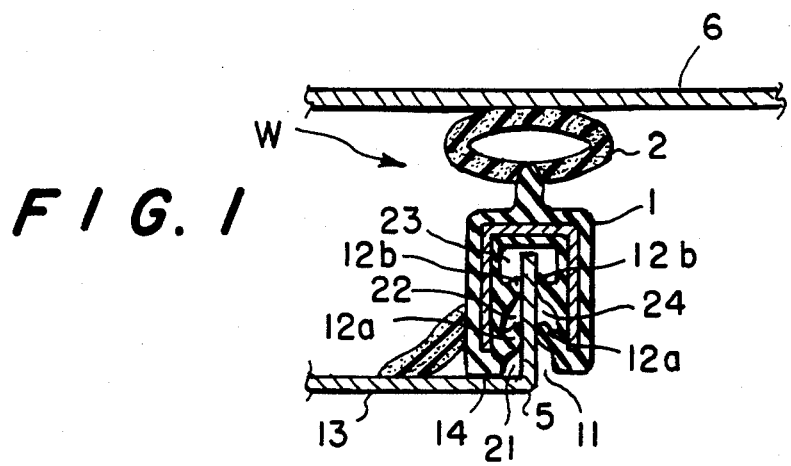
FIG. 1 is a transverse cross section of a sealing structure between a body flange and a door member of a vehicle having a weather strip according to an embodiment of the invention, showing a sectional view thereof at a continuous portion of the weather strip.

Referring first to FIG. 1, designated comprehensively at reference character W is a weather strip in a fitted position. Weather strip W comprises a strip body portion 1 shaped in the form of a channel and a seal portion 2 integrally formed on body portion 1.

Body portion 1 has at the lower end an opening 11 extending longitudinally and at both insides thereof either of paired sealing lips 12a, 12a and 12b, 12b projecting therefrom to oppose each other respectively, and extending longitudinally. Inserted in body portion 1 from opening 11 is a body flange 5 of a vehicle, the body flange 5 being fixed between respective pairs of opposed lips 12a, 12a and 12b, 12b, whereby weather strip W fits on body flange 5, while the vehicle has a door member 6 pressed to be in a sealing contact with seal portion 2 of weather strip W. Body portion 1 further has a subsidiary sealing lip 13 formed on the outside surface thereof as viewed from a passenger room of the vehicle and a sealing projection 14 formed under the base end of subsidiary sealing lip 13 at the lower end of body portion 1.

Incidentally, such as when washing the vehicle or in case of much rain, water may enter an inner space 21 of body portion 1 from between subsidiary sealing lip 13 and body flange 5 at jointed portions and irregular surface portions of body flange 5, so that there is a fear that the water might leak via inner spaces 22, 23 and 24 into the passenger room of the vehicle through those gaps existing between respective sealing lips 12a, 12a, 12b, 12b and body flange 5 at the jointed portions and irregular surface portions thereof.

Figure 5:
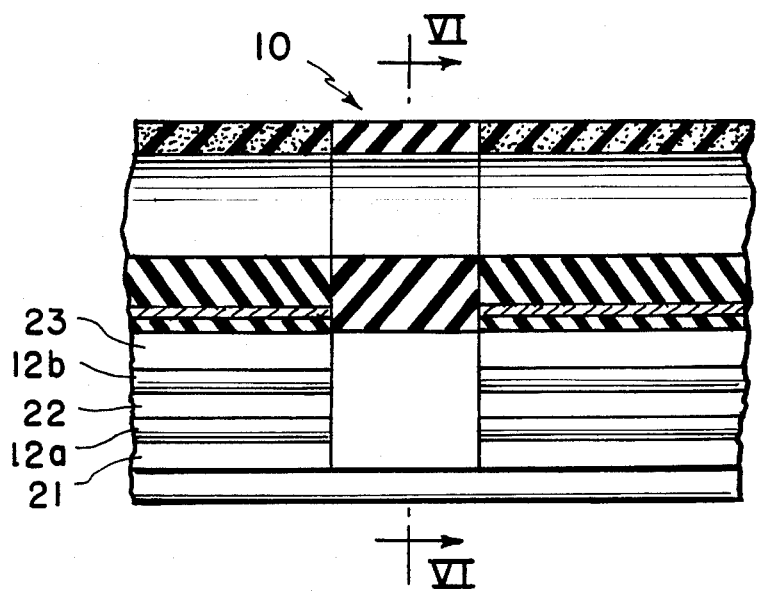
FIG. 5 is a longitudinal cross section of a principal portion including a connecting portion and a continuous portion of a conventional weather strip.
Figure 6:
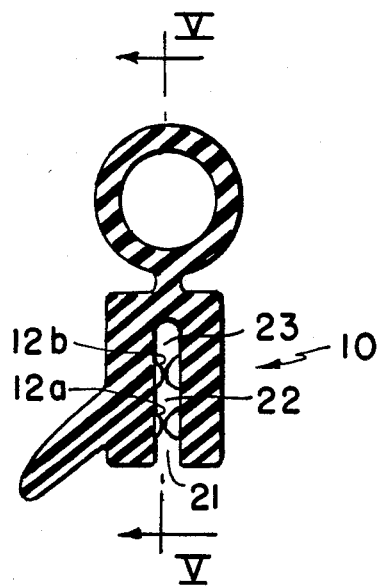
FIG. 6 is a transverse cross section of the connecting portion of the conventional weather strip, taken along line VI—VI of FIG. 5.

Particularly, the fear of water leakage will be increased in the case of conventional weather strips as extruded to be formed lengthwise typically by jointing their respective continuous portions with corresponding connecting portions to be filled, of which typical example is shown in FIGS. 5 and 6, wherein similar parts are designated at the same reference characters as the embodiment of the invention and wherein the exemplified conventional weather strip includes a connecting portion 10 having both side portions inwardly bulged or thick. Hence, the water as having entered a strip body portion of the weather strip and flowing therewithin may be stopped by and pooled near connecting portion 10, thus increasing the fear of leakage into a passenger room of a vehicle to which the weather strip is applied.

Figure 2:
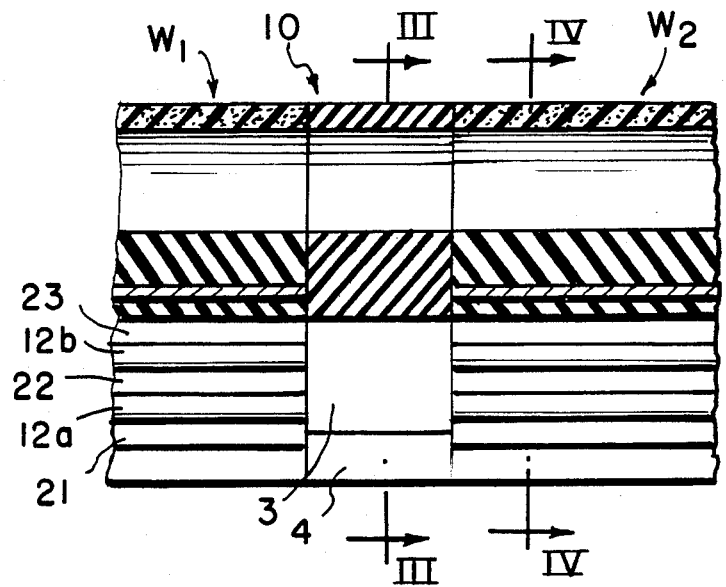
FIG. 2 is a longitudinal cross section of a principal portion including a connecting portion and the continuous portion of the weather strip of FIG. 1.
Figure 3:
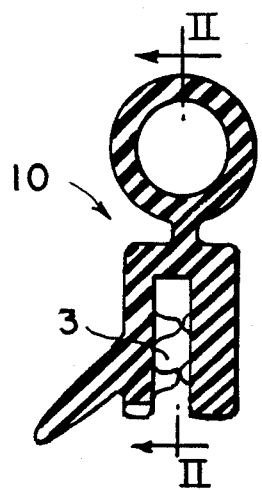
FIG. 3 is a cross section of the connecting portion of the weather strip, taken along line III—III of FIG. 2.
Figure 4:
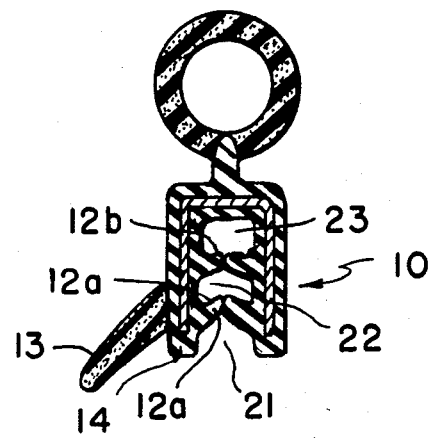
FIG. 4 is a cross section of the continuous portion of the weather strip, taken along line IV—IV of FIG. 2.

Referring now to FIGS. 2 to 4, particularly with reference to FIG. 2, designated at reference character 10 is a connecting portion of weather strip W, which is made by filling a rubber or resin material of the same kind as continuous portions $W_1$, $W_2$ of weather strip W into a molding form set between these portions $W_1$, $W_2$, the portions $W_1$, $W_2$ being formed through an extrusion process, similarly to conventional ones.

As shown in FIG. 3, connecting portion 10 also has on the upper side a tubular sealing portion and on the lower side a strip body portion shaped in the form of a channel with no sealing lip corresponding to either of lips 12a, 12a; 12b, 12b nor projection corresponding to projection 14 under subsidiary sealing lip 13. The body portion of connecting portion 10 has on the outer side relative to the passenger room of the vehicle its one half thereof formed with the same thickness as body portion 1 of either of continuous portions $W_1$, $W_2$ and on the inner side relative to same its other half thereof inwardly bulged or made thick so as to assure a pressed contact with body flange 5 as fitted in the strip body portion of connecting portion 10. Hence, connecting portion 10 has therein a space portion 3 without sealing lip, namely, partially defined by cut-away portions of sealing lips 12a, 12a; 12b, 12b and at the lower end a cut portion 4 permitting space portion 3 to communicate with an outer space between subsidiary lip 13 and body flange 5. Space portion 3 is further communicating with the before mentioned spaces 21, 22 and 23.

Even when water such as vehicle washing water has entered inner space 21 and advanced into spaces 22, 23 through the gaps between subsidiary lip 13 and body flange 5 such as at the jointed portions of this flange 5 as fitted in weather strip W including connecting portion 10, the water will run toward lower positions in respective spaces 21, 22 and 23, thus finally entering space portion 3 of connecting portion 10. Since space portion 3 is in communication with the exterior of the vehicle through cut portion 4 formed at the bottom of space portion 3, the water will be favorably drained outside of the vehicle, thus eliminating the conventional fear that the water might get over the distal edge of body flange 5 to advance into inner space 24 of body portion 1 and further leak into the interior of the passenger room of the vehicle.

With the structure described hitherto, weather strip W may favorably have connecting portion 10 disposed at a position which will become lowest when weather strip W is fitted on body flange 5, thereby to completely drain the water in body portion 1.

Further, connecting portion 10 must not be made through a filling process, namely, may be a single joint member formed with space portion 3 and cut portion 4. In this case, the joint member will be jointed, by using a binding agent for example, at both ends thereof with either of continuous portions $W_1$, $W_2$.

We claim:

1. A weather strip for a vehicle having a body flange to be sealed, comprising a strip body shaped in the form of a channel having an opening extending in the longitudinal direction thereof, the opening receiving said body flange therein, and at least one sealing lip formed on an inner surface of said strip body, said sealing lip extending in the longitudinal direction of and projecting inwardly of said strip body, said weather strip including at least one communicating portion, said communicating portion including means defining at least one interior area from which a portion of said sealing lip has been cut away to thereby define an opening in said at least one sealing lip and means below said opening in said sealing lip for providing communication between said opening in said sealing lip and the outside of said strip body to allow water which may have accumulated within said strip body to drain outside of the vehicle.

2. A weather strip for sealing a vehicle body flange, said weather strip having a primary, longitudinally extending sealing member integrally connected to a longitudinally extending substantially channel shaped member having means defining a longitudinally extending opening for receiving said body flange therein, said opening including means for sealingly and engageably gripping said body flange, said weather strip having at least at one portion along its gripping means defining an opening leading from the interior of said channel member to the exterior of said vehicle so that any liquid entrained between said strip and said flange can be discharged therefrom.

* * * * *